United States Patent [19]
Sakurai

[11] Patent Number: 6,059,464
[45] Date of Patent: May 9, 2000

[54] CAMERA

[75] Inventor: Motoharu Sakurai, Tokyo, Japan

[73] Assignee: SEIKO Precision Inc., Japan

[21] Appl. No.: 09/196,046

[22] Filed: Nov. 19, 1998

[30] Foreign Application Priority Data

Nov. 18, 1997 [JP] Japan ................................. 9-316820
Nov. 18, 1997 [JP] Japan ................................. 9-316821
Nov. 18, 1997 [JP] Japan ................................. 9-316822

[51] Int. Cl.$^7$ .................................................. G03B 17/24
[52] U.S. Cl. ............................................................. 396/413
[58] Field of Search ................................... 396/387, 411, 396/413, 6

[56] References Cited

U.S. PATENT DOCUMENTS

| | | | |
|---|---|---|---|
| 5,453,808 | 9/1995 | Zawodny et al. | 396/413 |
| 5,778,269 | 7/1998 | Williams | 396/413 |

*Primary Examiner*—David M. Gray
*Attorney, Agent, or Firm*—Adams & Wilks

[57] ABSTRACT

A camera comprises a film cartridge chamber for accommodating a film cartridge containing a film. The film cartridge has a first rotational shaft. An operating member is mounted for rotation in first and second opposite directions by manual operation for winding and rewinding the film, respectively. A second rotational shaft is provided for connection to the operating member during rotation of the operating member in the first direction. A wheel train transmits rotational movement of the operating member to the first rotational shaft to wind and rewind the film. A first clutch mechanism disconnects transmission of rotational movement by the wheel train when a tensional state of the film is generated. A second clutch mechanism connects the operating member to the second rotational shaft for integral rotation therewith during rotation of the operating member in the first direction, and makes the second rotational shaft freely rotatable with respect to the wheel train during rotation of the operating member in the second direction.

6 Claims, 9 Drawing Sheets

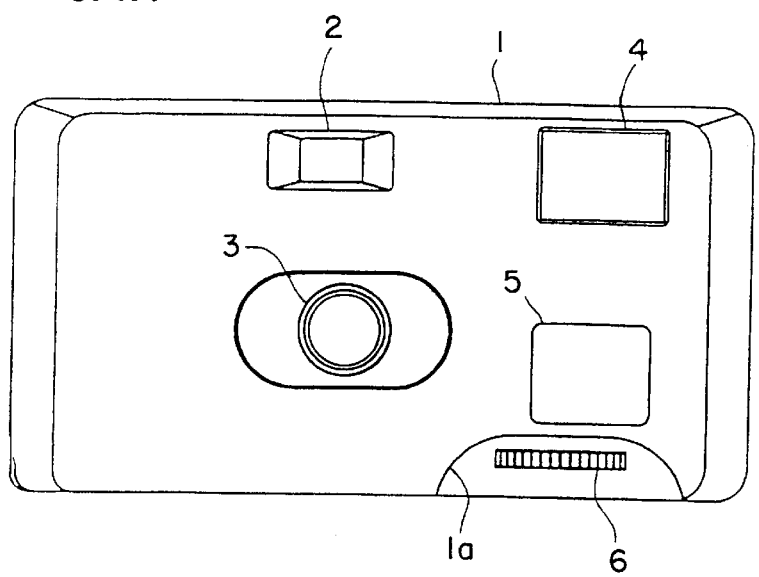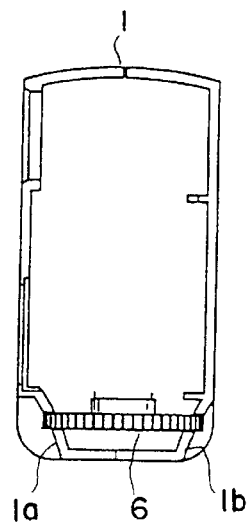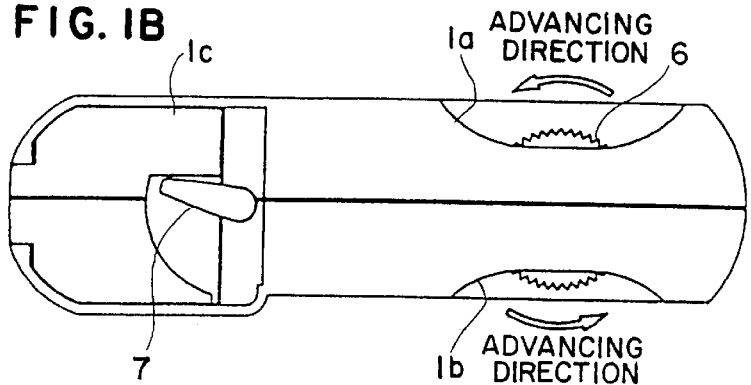

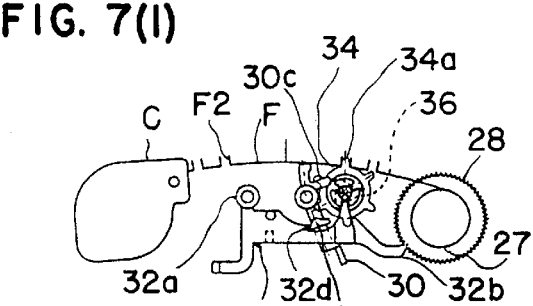
FIG. 7(1)
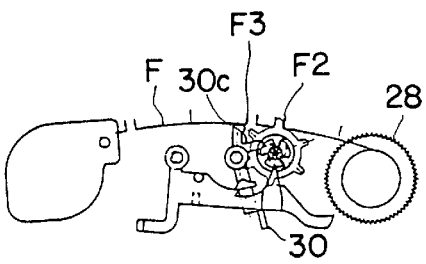
FIG. 7(7)
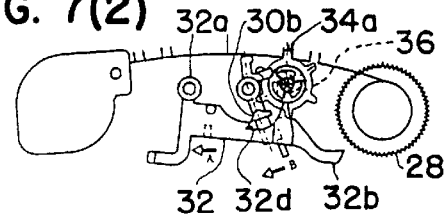
FIG. 7(2)
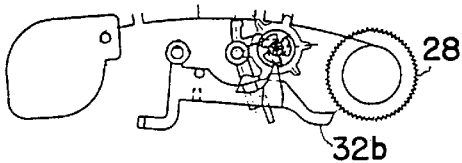
FIG. 7(8)
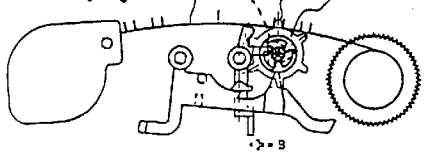
FIG. 7(3)
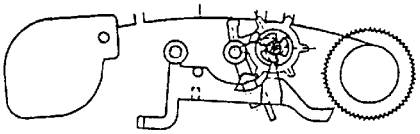
FIG. 7(9)
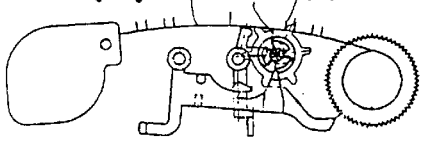
FIG. 7(4)
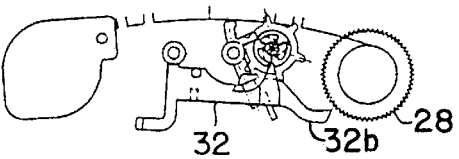
FIG. 7(10)
FIG. 7(5)
FIG. 7(11)
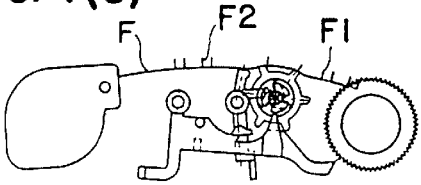
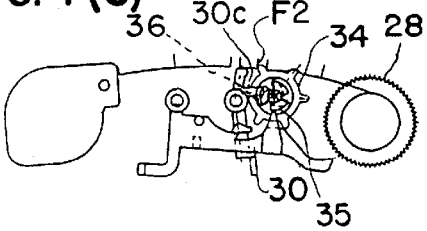
FIG. 7(6)
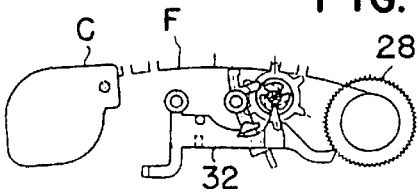
FIG. 7(12)

FIG. 11
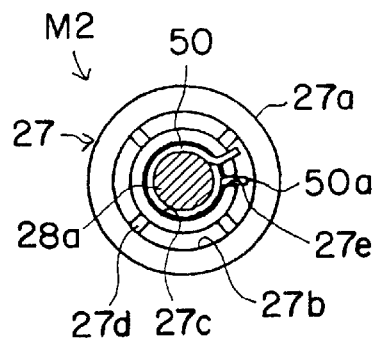
FIG. 12A
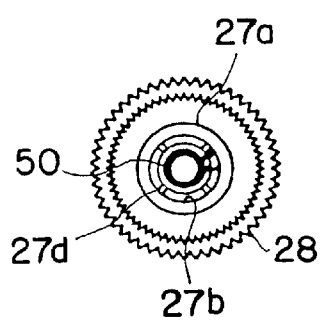
FIG. 12B
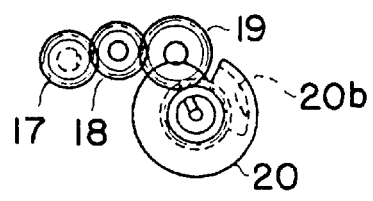
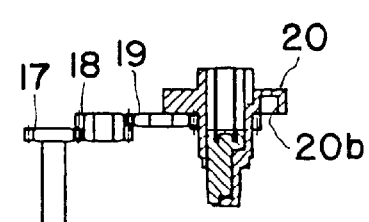
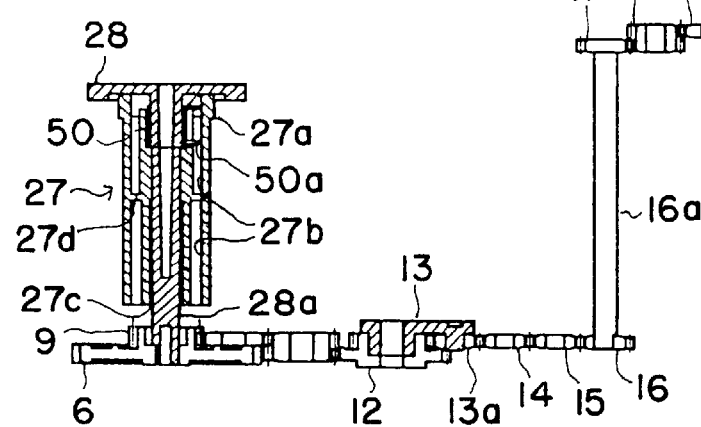
FIG. 12C

CAMERA

BACKGROUND OF THE INVENTION

FIELD OF THE INVENTION

The present invention relates to a camera and, more particularly, to a camera which is economical to manufacture and in which a film is manually wound and rewound.

BACKGROUND INFORMATION

Conventionally, a popular economical camera which is sometimes referred to as a so-called "film with a lens" has a lens and a film advancing apparatus. This type of camera is generally known as a throwaway or disposable camera. Although conventional disposable cameras have a simple structure, wasteful consumption has been promoted with respect to this type of camera since parts which may still be used are discarded.

There has been an increasing demand for a simple camera which has the attributes of both the disposable camera and an automatic or semi-automatic camera which is sometimes referred to as a so-called "compact camera". In an effort to satisfy this demand, there is known a simple camera which is not of the disposable type, which can be used continuously, and which can be manually wound and rewound. However, in such conventional camera in which the film can be replaced and operations such as winding and rewinding of the film are performed manually, a winding knob and a rewinding knob have been independently provided, so that the external appearance of the camera has not been aesthetic.

Moreover, in the foregoing conventional types of cameras in which the film can be replaced, confirmation as to whether the film has been received completely within a film cartridge of the camera during a rewinding operation is made by using a film counter or by means of a sensor or the like which outputs a display. When the confirmation is made by means of a film counter, there exists the possibility that the rewinding operation is interrupted before the film is completely received within the film cartridge when a person who is not familiar with the camera performs the rewinding operation. As a result, the film is removed from the camera in a state in which it is not sufficiently rewound, thereby generating a poorly photographed frame. On the other hand, the use of a sensor or the like for confirming whether the film has been received completely within the film cartridge increases the overall cost of the camera.

SUMMARY OF THE INVENTION

In order to solve the problem associated with the conventional art, a camera in accordance with the present invention has a knob which is rotated to advance and rewind a film, and the rotation of the knob is controlled by a rotating direction restricting member. In order to prevent a tensional state of a film from being generated at a time of advancing the film, a first clutch mechanism is provided in a first wheel train for permitting a film shaft to rotate freely by preventing transmission of motion by the first wheel train when the tensional state is generated in the film. Furthermore, a second clutch mechanism is provided as means for preventing a looseness of the film and for preventing the tensional state from being generated during the rewinding operation of the film.

Another feature of the present invention is the provision of a display on a bottom portion of the film cartridge for displaying that the film has already been photographed.

Moreover, in the camera according to the present invention, the knob for advancing and rewinding the film is exposed from both a front surface and a rear surface of a camera main body. By this construction, film advancing and rewinding operations can be performed from both surfaces of the camera main body. Furthermore, recess portions are provided on the front and rear surfaces of the camera main body to facilitate advancing and rewinding of the film.

According to an embodiment of the present invention, a camera comprises a film cartridge chamber for accommodating a film cartridge containing a film, the film cartridge having a first rotational shaft, an operating member mounted for rotation in first and second opposite directions by manual operation for winding and rewinding the film, respectively, a second rotational shaft for connection to the operating member during rotation of the operating member in the first direction, a wheel train for transmitting rotational movement of the operating member to the first rotational shaft to wind and rewind the film, a first clutch mechanism for disconnecting transmission of rotational movement by the wheel train when a tensional state of the film is generated, and a second clutch mechanism for connecting the operating member to the second rotational shaft for integral rotation therewith during rotation of the operating member in the first direction, and for making the second rotational shaft freely rotatable with respect to the wheel train during rotation of the operating member in the second direction.

Preferably, the second clutch mechanism comprises a coil spring having an end portion connected with the second rotational shaft.

It is preferable that a film detecting lever is provided near a cam plate in such a manner as to freely swing through a supporting shaft and in a state that an end portion of the film detecting lever is biased toward an outer peripheral portion of the plate cam, so that the completion of a rewinding operation can be readily detected.

The camera preferably comprises a main body having a first surface and a second surface opposite the first surface. The operating member is accessible from both the first and second surfaces of the camera main body during manual operation to facilitate winding and rewinding of the film. Each of the first and second surfaces of the camera main body has a recess; and wherein the operating member extends into but does not protrude from the recesses of the first and second surfaces. The operating member preferably comprises a knob provided in such a manner as to be capable of being manually operated from both the first and second surfaces of a camera main body.

BRIEF DESCRIPTION OF THE DRAWINGS

FIGS. 1A–1C are schematic views showing an outer appearance of a camera main body according to the present invention, where FIG. 1A is a plan view, FIG. 1B is a lower surface view and FIG. 1C is a horizontal cross sectional view of the camera main body;

FIG. 6A is a plan view of a partly notched cross section, FIG. 6B is a rear elevational view and FIG. 6C is a lower surface view;

FIGS. 7(1)–7(12) are a schematic view showing a movement sequence of a shutter lever and a release lever of the camera according to the present invention during advancing of the film;

FIGS. 9A–9C are plan views showing a positional relation between a cam and a film detecting lever, FIG. 9D is a bottom elevational view showing a display state of a film cartridge and FIG. 9E is a cross sectional view showing a state in which a projecting portion of a film detecting lever reaches an end portion of a groove portion in a plate cam;

FIG. 10A is a plan view having a partly notched cross section taken along line 10A—10A in FIG. 10B, and FIGS. 10B and 10C are lower elevational views;

FIG. 11 is an enlarged cross sectional view showing a state in which a spring clutch is mounted to an upper end portion of a roller; and FIGS. 12A–12C are cross sectional and plan views showing a positional relation between a first clutch mechanism and a second clutch mechanism.

DETAILED DESCRIPTION OF THE PREFERRED EMBODIMENT

Figure 2:
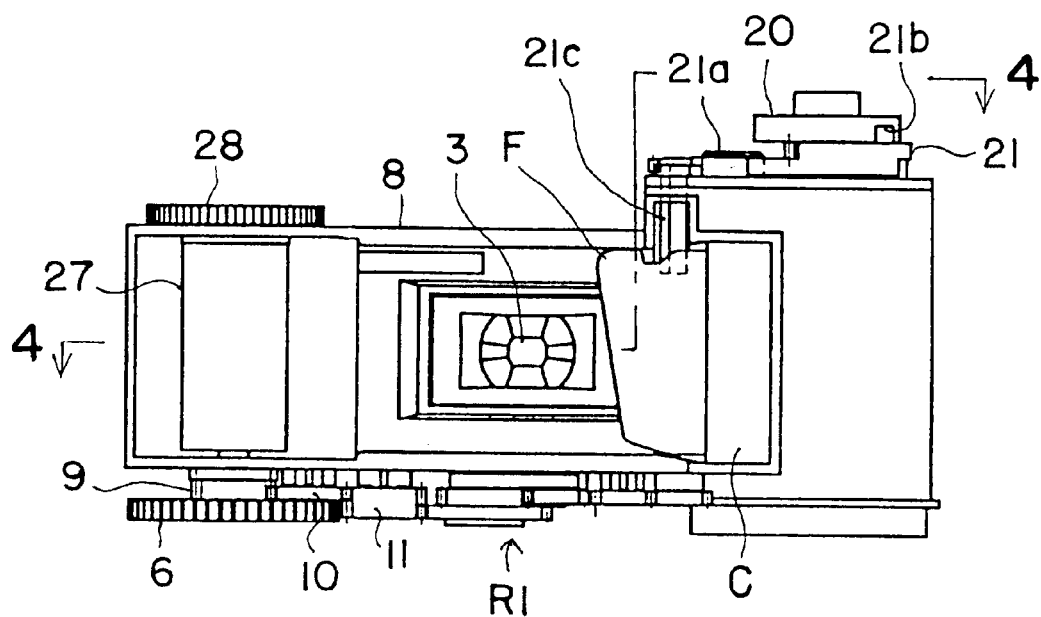
FIG. 2 is a rear elevational view showing an inner structure of the camera according to the present invention.

An embodiment in accordance with the present invention will be described below with reference to the accompanying drawings.

FIGS. 1A–1C show an outer appearance of a camera in accordance with an embodiment of the present invention. As shown in FIG. 1A, a finder 2, a lens 3, a flash 4 and a flash charge button 5 are provided on a front surface of a camera main body 1.

A recess 1a is formed in a rightward lower portion of the front surface of the camera main body 1, and an operating member comprising a knob 6 for advancing and rewinding a film is partly exposed from the recess 1a so as to be capable of being manually rotated. The knob 6 is also partly exposed from a recess 1b formed in a rear surface of the camera main body 1, as shown in FIGS. 1B and 1C, thereby permitting manual rotation of the knob 6 from the rear surface of the camera main body 1. Accordingly, an operation for advancing or winding the film can be performed by manually contacting the knob 6 from the recess 1b in the rear surface of the camera main body 1 and rotating the knob 6 in a winding direction (counterclockwise in FIG. 1C). Likewise, an operation for rewinding the film can be performed by manually contacting the recess 1a in the front surface of the camera main body 1 and rotating the knob in a rewinding direction (clockwise in FIG. 1C). The recesses 1a and 1b have a size and configuration which facilitates manual rotation thereof.

By the foregoing construction, rotation of the knob 6 in the winding and rewinding directions is facilitated since winding of the film during a photographing operation and rewinding of the film after the photographing operation can be independently accomplished from the rear surface and the front surface, respectively, of the camera main body 1. Furthermore, as shown in FIG. 1B, the outer periphery of the knob 6 which is contacted by the photographer to rotate the knob does not protrude from the front and rear surfaces of the camera main body 1. By this construction, the camera has an aesthetic external appearance, and the knob 6 is prevented from colliding with other objects while being carried by the photographer, thereby avoiding damage.

Figure 3:
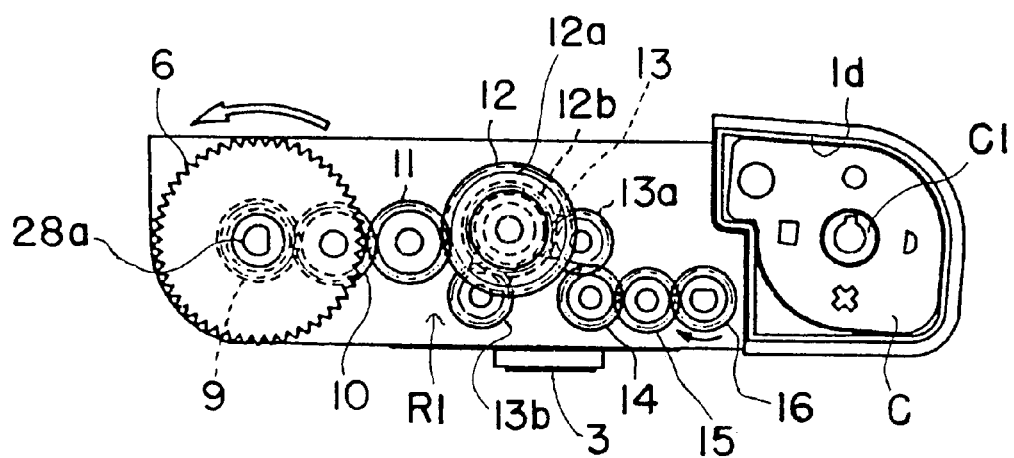
FIG. 3 is a bottom elevational view showing an inner structure of the camera according to the present invention.

As shown in FIGS. 1B and 3, a film cartridge C is inserted into a film cartridge chamber or film cartridge housing portion 1d of the camera main body 1 by opening a cover 1c. An operating lever 7 for locking the cover 1c of the film cartridge housing portion 1d is provided on a bottom surface of the camera main body 1.

Figure 4:
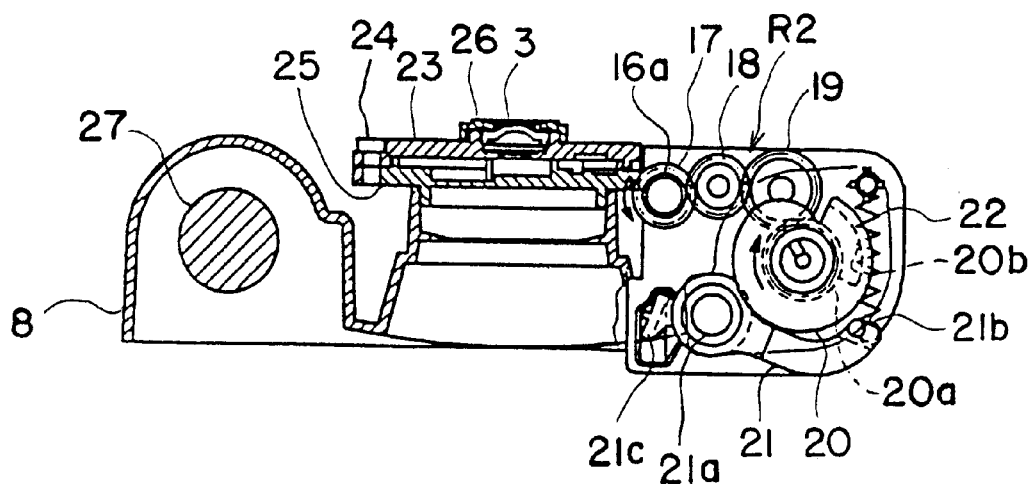
FIG. 4 is a cross sectional view of the camera according to the present invention taken along line 4—4 in FIG. 2.
Figure 5:
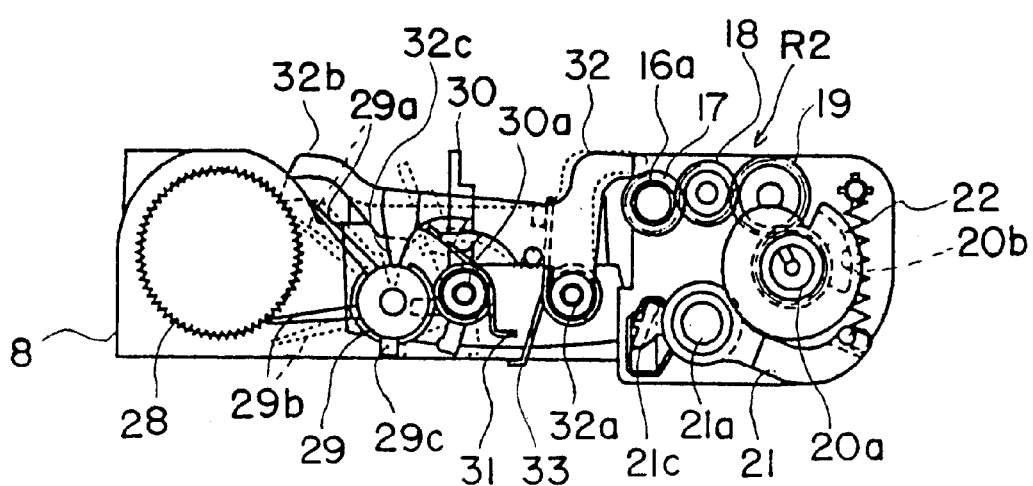
FIG. 5 is a plan view showing an inner structure of the camera according to the present invention.

FIG. 2 is a rear elevational view of the camera according to the present invention in the state in which a rear cover has been removed, and a film cartridge C, such as for an advanced photo system (hereafter referred to as APS), has been inserted in the film housing cartridge portion 1d. FIG. 3 shows a bottom elevational view of the camera according to the present invention. A film advancing shaft 28a is mounted on a frame portion 8 of the camera main body 1 for relative rotation thereto. The knob 6 is mounted centrally on a front end portion of the film advancing shaft 28a for rotation therewith. A ratchet gear 28 is integrally connected to a rear end portion of the film advancing shaft 28a for rotation therewith and for integral rotation with the knob 6. A roller 27 for advancing the film is fitted over a peripheral surface of the film advancing shaft 28a for rotation therewith. A drive gear 9 is integrally connected to an upper surface of the knob 6 for rotation therewith and is disposed on the bottom surface side of the frame 8. Rotation of the drive gear 9 drives a set of wheel trains which transmit the rotation of the knob 6 to a film shaft C1. As shown in FIGS. 3–5, the set of wheel trains comprises a first wheel train R1 disposed on the bottom surface side of the frame 8 and a second wheel train R2 disposed on an upper surface side of the frame 8 (FIGS. 4 and 5).

The first wheel train R1 comprises gears 10–15 and transmits a rotation of the drive gear 9 to a gear 16 successively through the gears 10 to 15. The gear 16 transmits rotation of the first wheel train R1 to the second wheel train R2 through a transmission shaft 16a. The gear 12 is disposed generally centrally in the first wheel train R1. The gear 12 comprises a stepped gear which includes a first, large diameter gear 12a and a second, small diameter gear 12b integral with the gear 12a. Rotation transmitted from the knob 6 is received by the first gear 12a of the stepped gear 12, and a rotational output of the stepped gear 12 is transmitted to a film shaft C1 by the second gear 12b. By this construction, a rotational speed of the film shaft C1 is reduced with respect to the rotation of the knob 6 at a degree in proportion to a ratio of a number of teeth between the large diameter gear 12a and the small diameter gear 12a.

A clutch lever 13 constitutes a first clutch mechanism and has a generally L-shaped configuration defining two arms axially supporting clutch gears 13a, 13b, respectively, at front end portions of the arms. The clutch lever 13 is mounted on a supporting shaft of the stepped gear 12 in such a manner so as to be freely pivotable. The clutch gears 13a and 13b of the clutch lever 13 are in driving engagement with the second gear 12b of the stepped gear 12, and are selectively engageable with the gear 14 by pivoting movement of the clutch lever 13 in accordance with a rotating direction of the stepped gear 12. Accordingly, when the knob 6 is rotated in the counterclockwise direction for advancing or winding the film, as shown by the arrow in FIG. 1B, the stepped gear 12 rotates in a clockwise direction, and the clutch lever 13 rotates with the steppped gear 12 so that the clutch gear 13a engages the gear 14. In contrast, when the knob 6 is rotated in a clockwise direction for rewinding the film, the stepped gear 12 rotates in a counterclockwise direction, and the clutch lever 13 rotates with the stepped gear 12 so that the clutch gear 13b engages the gear 14.

FIG. 4 shows an inner structure of a left half and an upper structure of a right half of the camera shown in FIG. 2, and FIG. 5 shows the complete total structure of an upper portion of the camera shown in FIG. 2. As shown in FIGS. 4 and 5, a second drive gear 17 is connected in driving engagement with the transmission shaft 16a of the gear 16 for transmitting a rotation transmitted by the first wheel train R1 to the second wheel train R2. Rotation of the first and second wheel trains R1, R2 rotate a film shaft drive gear 20a, a cam 20 and the film shaft C1 through gears 18 and 19 of the second wheel train R2.

A film detecting lever 21 has a curved plate body mounted on a supporting shaft 21a for pivotal movement. The curved plate body has an upper surface at a front end portion thereof provided with a projecting portion 21b disposed near an outer peripheral portion of the cam 20. An end portion of a tension spring 22 is connected to a front end portion of the film detecting lever 21, thereby urging the film detecting lever 21 in a counterclockwise direction. A contact piece 21c comprises a protrusion integrally connected to the supporting shaft 21a of the film detecting lever 21 for pivotal movement. The contact piece 21c extends vertically from a lower surface of a top plate portion of the frame 8 and is adapted to pivot within a window portion disposed on the top plate portion of the frame 8 during pivotal movement of the film detecting lever 21.

As shown in FIG. 4, the lens 3 is disposed in a central portion of the front surface side of the frame 8. The lens is fixed to a lens mounting plate fitted within an opening portion of the frame 8 by a lens holder 24 fixed through a screw 25. A peripheral surface of the lens 3 is pressed against the lens holder 24 by a lens pressing plate 26.

As shown in FIG. 5, a control member comprising a reverse rotation preventing lever 29 has two reverse rotation preventing pawls or hooks 29a, 29b defining a generally V-shaped configuration and disposed at a position close to the ratchet gear 28. A front end portion of a selected one of the reverse rotation preventing hooks 29a, 29b of the reverse rotation preventing lever 29 engages with a tooth portion of the ratchet gear 28 to thereby prevent the ratchet gear from rotating. A protrusion 29c engaging with a switching plate 43, as described further below, is provided in a circular ring portion of the reverse rotation preventing lever 29.

A shutter lever 30 is mounted on a supporting shaft 30a for pivotal movement at a position adjacent to the reverse rotation preventing lever 29. The shutter lever 30 is biased in a clockwise direction (as viewed in FIG. 5) by a torsion coil spring 31 fitted on the supporting shaft 30a.

A release lever 32 having a generally planar shape is disposed at a position close to the front surface of a central upper portion of the frame 8. The release lever 32 has a front leg portion mounted on a supporting shaft 32a for pivotal movement, a locking portion 32b for engagement with a tooth portion of the ratchet gear 28, an a rear leg portion defining a cam contact element 32c for restricting a position of the locking portion 32b. The cam contact element 32c is mounted for pivotal movement about the same axis as the reverse rotation preventing lever 29 and is engageable with a cam 35. The release lever 32 is biased in a counterclockwise direction by a torsion coil spring 33 fitted on the supporting shaft 32a.

Next, the film advancing mechanism will be described below.

Figure 6A:
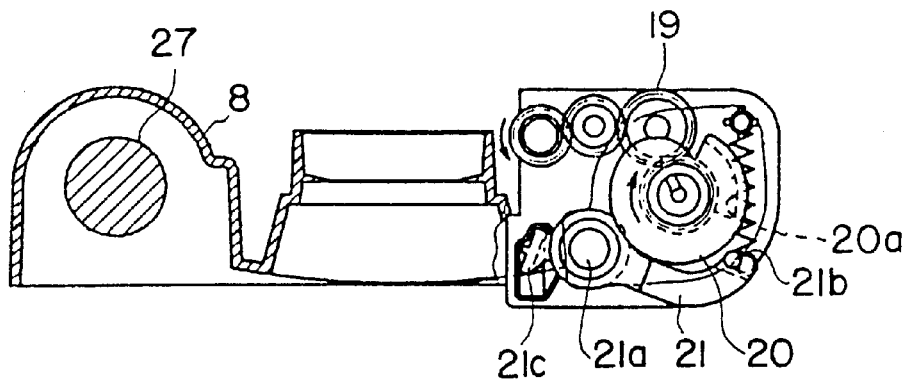
FIGS. 6A–6B are schematic views showing a movement sequence of elements of the camera according to the present invention during advancing of the film, where
Figure 6B:
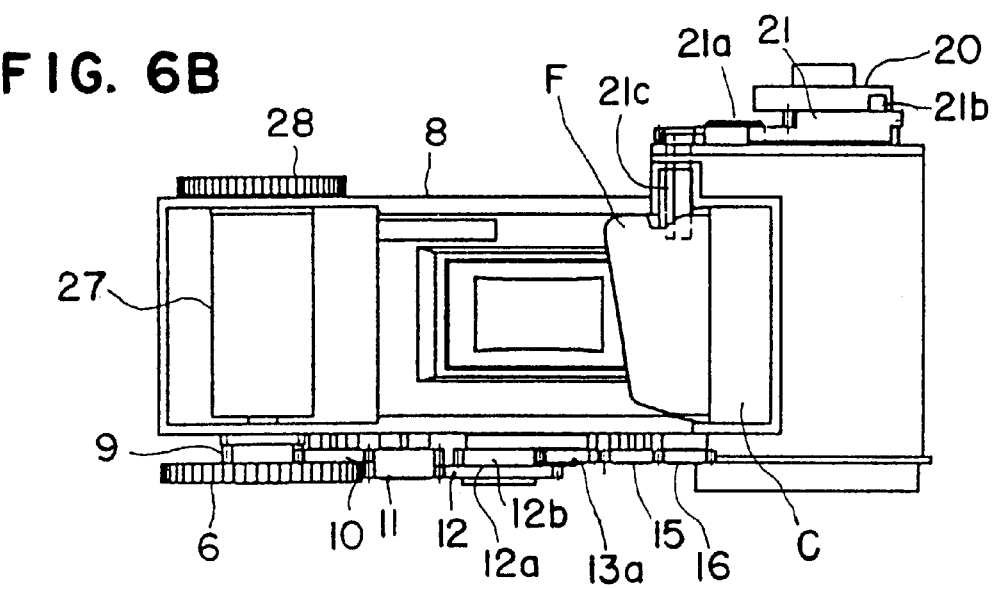
Figure 6C:
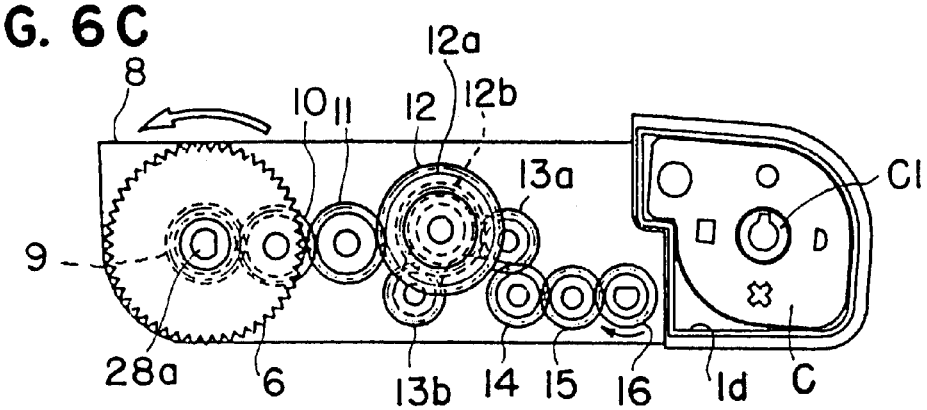

FIGS. 6A–6C show the state of the camera at the commencement of a film advancing operation. In this state, when the knob 6 is rotated in a counterclockwise direction to advance the film, as shown by the arrow in FIG. 6C, the clutch lever 13 rotates in a clockwise direction together with the rotation of the stepped gear 12, so that the clutch gear 13a engages the gear 14. In accordance with the film advancing operation at this time, the film shaft drive gear 20a integrally rotating with the film shaft C1 through the first wheel train R1 and the second wheel train R2 rotates so as to push out a film F from the film cartridge C, thereby advancing an end portion of the film F to the film advancing roller 27.

When the film F is advanced by the film advancing roller 27, a force for rotating the film shaft C1 through the film is operated. However, since the rotation speed of the film shaft C1 is set to be slower than the rotation speed of the film advancing roller 27 due to the speed reduction ratio of the first wheel train R1, the gear 14 rotates faster than the clutch gear 13a. Accordingly, the clutch gear 13a is moved out of engagement with the gear 14, and the film shaft C1 is freely rotatable so that the film F can be advanced to the film advancing roller 27.

FIG. 7 shows the successive motions of the elements of the camera according to the present invention during a film advancing or winding operation. The succesive motions are indicated by reference numerals enclosed in parentheses as shown at (1)–(12).

A sprocket 34 is coaxially arranged below the reverse rotation preventing lever 29 shown in FIG. 5, and the cam 35 (motion 6) is coaxially adhered to the sprocket 34.

Motion (1) shows a state in which the one frame of the film F has been advanced to the film advancing roller 27, and in which the locking portion 32b of the release lever 32 engages with the tooth portion of the ratchet gear 28 so as to make the roller film advancing roller 27 non-rotatable. Furthermore, the shutter lever 30 is urged in a clockwise direction, and a projection 30b of the shutter 30 engages with the projection 32d of the release lever 32. The sprocket 34 has projection 34a which engages which a perforation F1 formed on an upper portion of the film F.

Motion (2) shows a state in which the shutter release has been turned on. The release lever 32 is pivoted in a direction of an arrow A, thereby rotating in a clockwise direction around the supporting shaft 32a so that the locking portion 32b is separated from the ratchet gear 28. Further, the projection 30b of the shutter lever 30 is separated from the projection portion 32d of the release lever 32 to allow free pivotal movement in a clockwise direction due to an urging force, as shown by an arrow B, so as to drive a sector (not shown).

Motions (3) to (5) show a state in which the film advancing operation is started after driving the sector and finishing an exposure operation. In this process, the sprocket 34 rotates at a fixed angle in a clockwise direction through the perforation F1 of the film F. When the film is further advanced, the projection 34a of the sprocket 34 is separated from the perforation F1 and is brought into contact with a portion of the film F which does not have a perforation. In this state, the projection 34a of the sprocket 34 is in sliding contact with the the film F.

When the film F is further advanced, as shown in motion (6), the projection 34a of the sprocket 34 engages the next perforation F2, and the sprocket 34 starts rotating in response to a movement of the film F. When the cam 35 rotates together with the sprocket 34, the contact element 30c of the shutter lever 30 is displaced by the cam 36, and charges an energy caused by a rotational displacement in a counterclockwise direction against the urging force of the spring 31.

Motions (7) to (9) show a state in which the energy is being charged by advancing the film. The locking portion 32b of the release lever 32 is in a state in which its engagement with the tooth portion of the ratchet gear 28 has been removed.

When the advancing of the film is progressed to the state of the motions (10) to (12), the locking portion 32b of the release lever 32 engages with the tooth portion of the ratchet gear 28 so as to lock the knob 6, thereby completing the charging motion. In the state of the motion (12), the film advancing operation is finished, thereby returning to the state shown by motion (1). The foregoing steps of the motions (1) to (12) are repeated for photographing at every one frame.

Figure 8:
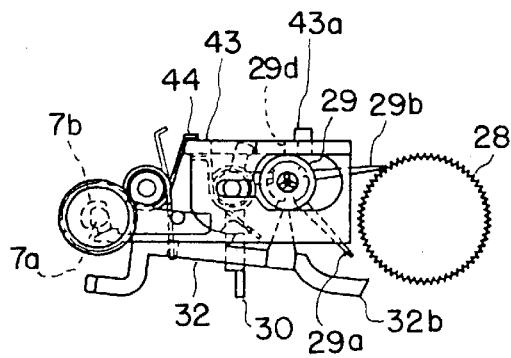
FIGS. 8(1)–8(7) are a schematic view showing a movement sequence of a reverse rotation preventing lever of the camera according to the present invention during rewinding of the film.
Figure 8:
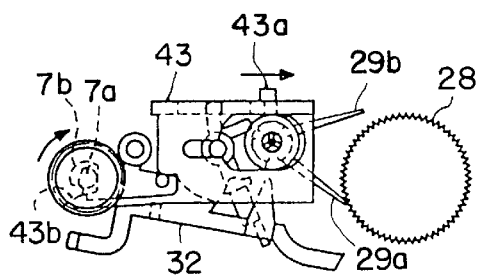
Figure 8:
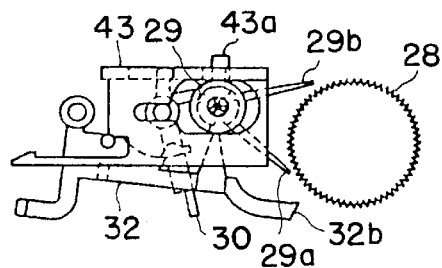
Figure 8:
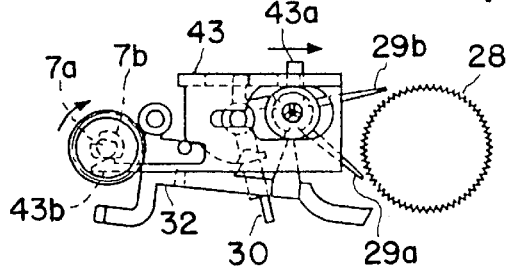
Figure 8:
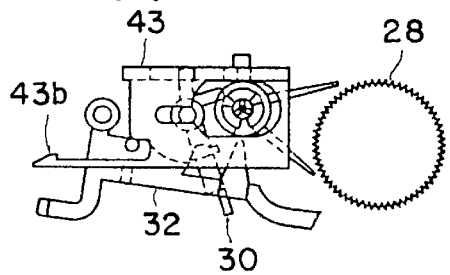
Figure 8:
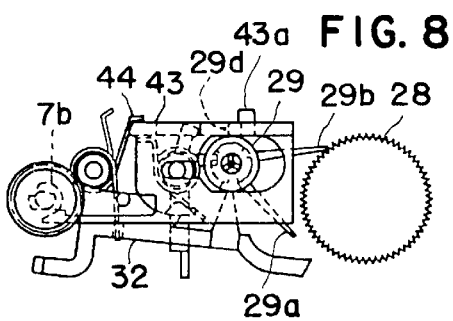
Figure 8:
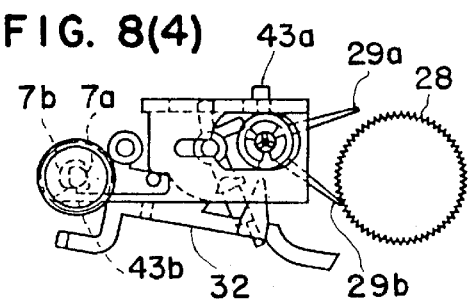

FIG. 8 shows the successive motions of the elements of the camera according to the present invention during a film rewinding operation. The successive motions are indicated by reference numerals enclosed in parentheses as shown at (1)–(7).

The reverse rotation preventing lever 29 constitutes reverse rotation restricting means for restricting rotation of the knob 6 and the film advancing roller 27. The reverse rotation preventing lever 29 is structured such that any one of the reverse rotation preventing hooks 29a and 29b engages with the tooth portion of the ratchet gear 28, thereby restricting the rotation of the knob 6 and the film advancing roller 27 integrally connected to the knob 6. Whether the film can not be advanced or rewound is selected by movement of a switching plate 43 in a lateral (FIG. 8).

Motion (1) in FIG. 8 shows a state in which normal photographing can be performed, and is the same state as the state shown in FIG. 5. In this state, since the reverse rotation preventing hook 29b of the reverse rotation preventing lever 29 engages the ratchet gear 28, a film rewinding operation can not be performed. This state can be maintained while the switching plate 43 is urged in the direction of the ratchet gear by the spring 44. The projection 29d formed in the circular ring portion of the reverse rotation preventing lever 29 is loosely fitted in a hole portion provided in the switching plate 43, and switching to permit winding or rewinding of the film F is performed by pivoting the reverse rotation preventing lever 29 upon movement of the switching plate 43 in a lateral direction (in the motions shown in FIG. 8).

Motion (2) shows a state in which the switching plate 43 slightly moves leftward (e.g., 1.9 mm) from the state of motion (1). The movement is performed by moving a switching protrusion 43a of the switching plate 43 leftward against the spring force. Accordingly, the reverse rotation preventing lever 29 also slightly rotates in a counterclockwise direction, so that the reverse rotation preventing hook 29b is removed from the ratchet gear 28. Similarly, the shutter lever 30 and the release lever 32 rotate in a counterclockwise direction and a clockwise direction, respectively, against the urging force of the switching plate 43 so as to be in a slightly inclined state.

Motion (3) shows a state in which the switching plate 43 is further moved slightly leftward (e.g., 2.5 mm from an original position) from the state of motion (2).

Motion (4) shows a state in which the switching plate 43 is further moved slightly leftward (e.g., 3 mm from an original position) from the state of motion (3) so that the locking lever 29b of the reverse rotation preventing lever 28 engages with the tooth portion of the ratchet gear 28. In this state, the shutter lever 30 and the release lever 32 are inclined in a state of being most charged, and a hook portion of a locking member 43b extending leftward from an end portion of the switching plate 43 is hooked with a hook portion 7b connected to the supporting shaft 7a of the operating lever 7 (FIG. 1) in the film cover 1c. By this construction, the switching plate 43 can return rightward due to the urging force of the spring.

Motion (5) shows a state in which the film rewinding operation is performed in the state of motion (4) and the rewinding motion is completed. Here, when the operating lever 7 of the film cover 1c is rotated in a clockwise direction, as shown by the arrow in motion (5)), the locking member 43b is disengaged from the locking portion 7b and, as shown in motion (6), the switching plate 43 moves rightward due to the urging force, so that the reverse rotation preventing hook 29a of the reverse rotation preventing lever 29 is removed from the ratchet gear 28 so that the ratchet gear 28 is in a freewheel state. At this time, since the shutter lever 30 returns faster than the release lever 32, no charge is left in the spring biasing the shutter lever.

Motion (7) shows a state in which the switching plate 43 returns to the original position. In this state, the rotation preventing hook 29b of the reverse rotation preventing lever 29 is locked to the ratchet gear 28 so that the film can be taken out.

Figure 9A:
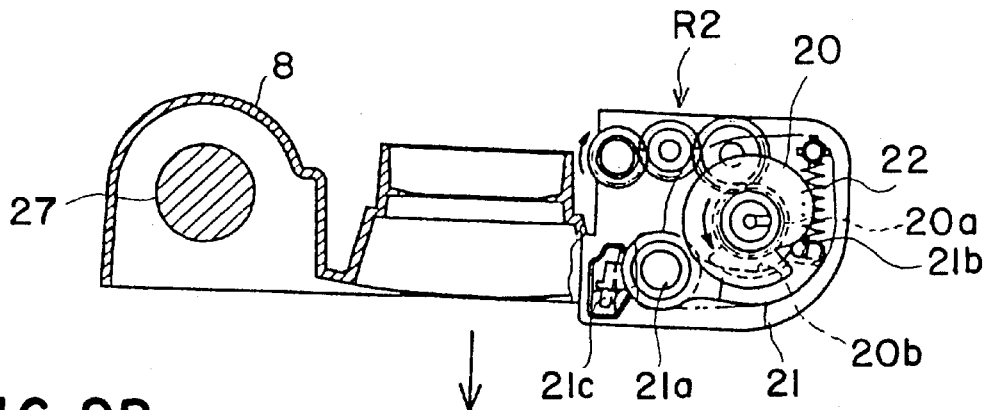
FIGS. 9A–9E are schematic views showing a movement sequence of a rotating mechanism of a film shaft during rewinding of the film, where
Figure 9B:
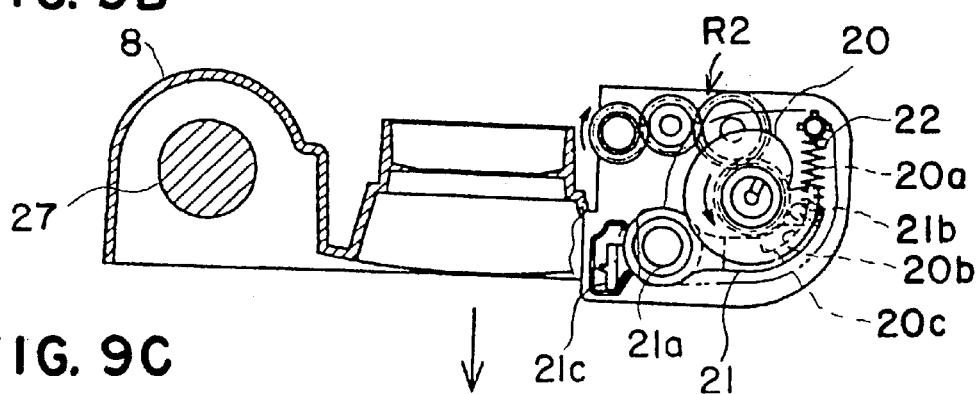
Figure 9C:
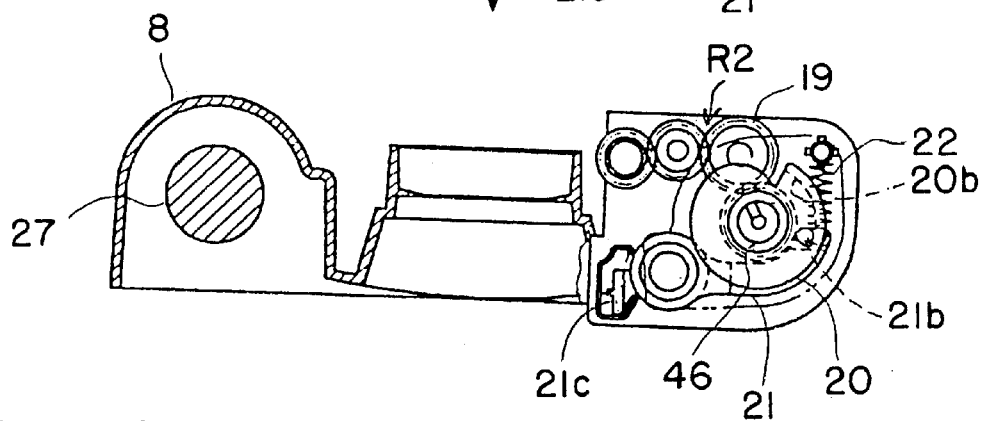

FIGS. 9A–9C show a motion of the film shaft drive gear 20a and the film detecting lever 21 at a time of rewinding the film, and successively shows processes by which the projecting portion 21b of the film detecting lever 21 is guided to the groove portion 20b of the cam plate 20.

In FIG. 9A, when the film shaft C1 is rotated in a counterclockwise direction by the second wheel train R2 and the film is rewound within the film cartridge C, the contact piece 21c of the film detecting lever 2 is released from the tensional state of the film, the film detecting lever 21 pivots in a counterclockwise direction due to the urging force of the spring 22, and the projecting portion 21b is brought into contact with the outer peripheral portion of the cam plate 20. In this state, when the cam plate 20 rotates in a counterclockwise direction, the projecting portion 21b is guided within a circular arc-shaped groove 20b formed in the lower surface side of the cam plate 20, as shown in FIG. 9B. When the plate cam 20 further continues rotating in the same direction, the projecting portion 21b reaches the end portion 20c of the groove portion 20b, as shown in FIG. 9C, and the cam 20. In this state, the film shaft C1 can not be further rotated.

Figure 9D:
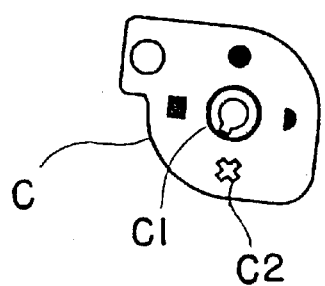
Figure 9E:
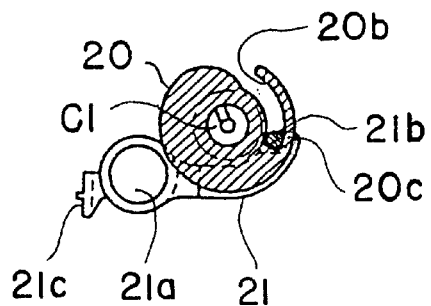

When the film is rewound to this state, a cross-shaped transparent hole portion C2 in a display portion for displaying a film use state provided on the lower surface of the film cartridge C changes to a white color, as shown in FIG. 9D, so as to display that the film has been already photographed. This can be displayed by setting the end portion 20c of the groove portion 20b to be aligned with a position at which the display portion C2 of the film cartridge C displays a white color (refer to FIG. 9E). The groove portion 20b has a length at which the tensional state of the film F is canceled, the film detecting lever 29 is pivoted and the front end of the film F is received within the film cartridge C. Accordingly, when the tensional state of the film F is released from the contact piece 21 and the projecting portion 21b is brought into contact with the cam plate 20 due to the urging force of the spring 22, the film F can be securely received within the film cartridge C even in the case that the projecting portion 21b is brought into contact with any position of the cam plate 20.

Figure 10A:
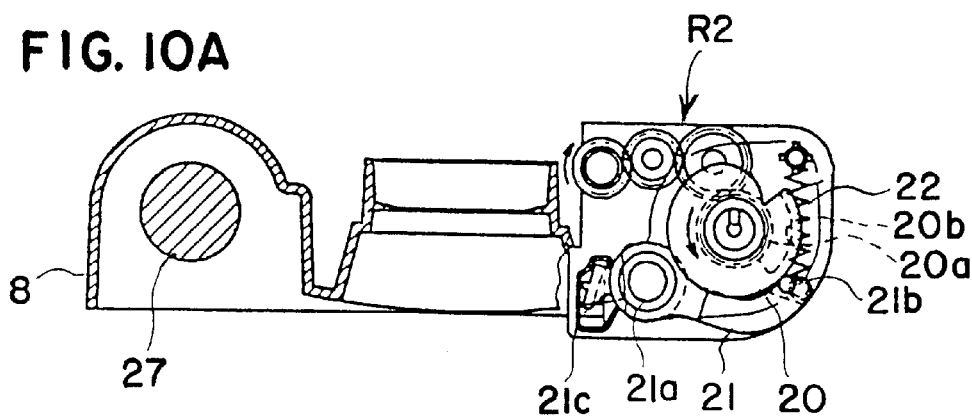
FIGS. 10A–10C are schematic views showing a state in which the film is rewound, where
Figure 10B:
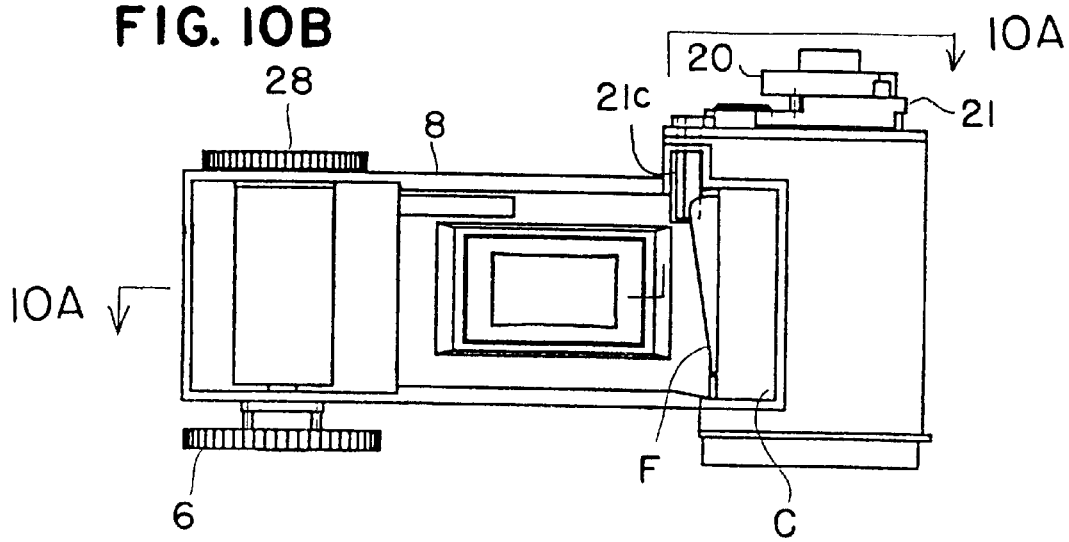
Figure 10C:
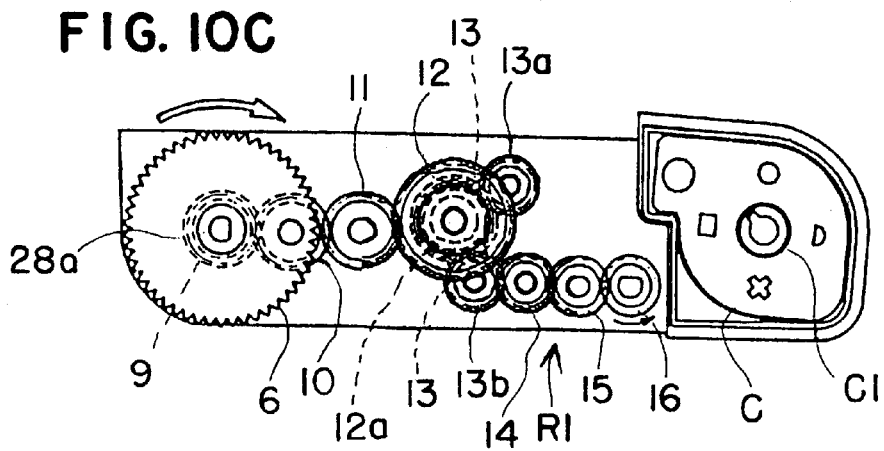

FIGS. 10A–10C show a state of rewinding the film in the same manner as that of FIG. 9, in which the knob 6 is rotated in a clockwise direction so as to rewind the film F from the roller 27 before the rewinding within the film cartridge C is finished. As shown in FIG. 10A, since the contact piece 21c of the film detecting lever 21 is removed from the film F, the projecting portion 21b is pressed against the outer periphery of the cam 20. At this time, as shown in FIG. 10C, since the L-shaped clutch lever 13 is rotated when the stepped gear 12 rotates in a counterclockwise direction, the clutch gear 13b engages the gear 14. As a result, the film shaft C1 rotates through the first and second wheel trains R1 and R2, so that it is possible to rewind the film F within the film cartridge C.

FIG. 11 shows a clutch spring 50, constituting a second clutch mechanism, disposed within the film advancing roller 27. FIG. 12 shows a positional relation between the first clutch mechanism 13 and the second clutch mechanism 50.

The film advancing roller 27 has a generally cylindrical shape and has an upper end portion 27a and an outer peripheral wall portion. The upper end portion 27a is formed in a large diameter portion having a predetermined width, and the outer peripheral wall portion of the film advancing roller 27 is provided with a hollow portion 27b for preventing shrinkage of the film advancing roller 27. Four reinforcing ribs 27d are provided within the hollow portion 27b. An axial hole 27c into which the film advancing shaft 28a is inserted is extended through the center portion of the roller 27. A groove portion 27e engaging an engaging piece 50a in a lower end portion of the clutch spring 50 is provided in the axial hole 27c.

The clutch spring 50 preferably comprises a coil spring having a predetermined length and which can engage with the advancing shaft 28a. The engaging piece 50a of the clutch spring 50 is formed by bending outwardly both ends of a wire corresponding to a raw material. The clutch spring 50 is inserted into the advancing shaft 28a of the ratchet gear 28, and the engaging piece 50a can engage with the groove portion 27e so as to transmit the rotation in only one direction when the ratchet gear is rotated in a preselected direction at a suitable angle. Accordingly, the clutch spring 50 functions as a one-way clutch. That is, when the rotating direction of the ratchet gear 28 is opposite to the winding direction of the clutch spring 50 (in the drawing, the advancing shaft 28a rotates in a counterclockwise direction), the spring is loosened and the diameter becomes large. Therefore, a gap is generated between the clutch spring 50 and the advancing shaft 28a, so that the film advancing roller 27 is in a freewheel state.

In contrast, in the case that the force is applied to a direction of pulling both ends of the clutch spring 50, since the clutch spring 50 is wound and fastened, and the diameter becomes small, a frictional force between the clutch spring 50 and the advancing shaft 28a becomes large, so that both can be integrally rotated by the frictional force. Therefore, at a time of advancing the film, the knob 6 and the film advancing roller 27 are made integrally rotatable, and at a time of rewinding the film, the film advancing roller is in a freewheel state. By this construction, the rewinding of the film can be made possible by rotating the film shaft C1 through the first and second wheel trains R1 and R2.

It is understood by those of ordinary skill in the art that the number and arrangement of the wheel trains can be modified without departing from the spirit and scope of the present invention.

In accordance with the present invention, since the first clutch mechanism 13 is provided, the problems associated with tensioning of the film during film advancement is prevented, and the film advancing operation can be performed smoothly.

Further, since the second clutch mechanism 50 is provided, the rewinding operation can be performed smoothly by placing the film advancing roller in a freewheel state during the rewinding operation.

Still further, since the projecting portion provided at the front end portion of the film detecting lever is guided to the groove portion formed in the cam plate integrally connected with the film shaft drive gear at a time of performing the film rewinding operation, and the stop position at the end portion is set to be the final position of the film rewinding operation, it is possible to make a determination that the film rewinding operation has been completely performed. Accordingly, it is possible to subsequently remove the film from the camera without obtaining poorly photographed frames.

Since the length of the groove portion provided in the cam plate is set such that the tensional state of the film is canceled from the contact piece of the film detecting lever, and the film is received within the film cartridge, the film can be completely received within the film cartridge when the film detecting lever stops at the end portion even in the case that the film detecting lever is brought into contact with any portion of the cam.

Moreover, since the film winding and rewinding operations can be performed from both of the front and rear surfaces of the camera main body, the winding and rewinding operation can be easily performed. Furthermore, since recess portions exposing the knob to the outer portion of the camera main body is provided on both the front and rear surfaces of the camera main body, any potential damage to the knob is greatly reduced, and the camera main body has an aesthetic outer appearance.

What is claimed is:

1. A camera comprising: a film cartridge chamber for accommodating a film cartridge containing a film, the film cartridge having a first rotational shaft; an operating member mounted for rotation in first and second opposite directions by manual operation for winding and rewinding the film, respectively; a second rotational shaft for connection to the operating member during rotation of the operating member in the first direction; a wheel train for transmitting rotational movement of the operating member to the first rotational shaft to wind and rewind the film; a first clutch mechanism for disconnecting transmission of rotational movement by the wheel train when a tensional state of the film is generated; and a second clutch mechanism for connecting the operating member to the second rotational shaft for integral rotation therewith during rotation of the operating member in the first direction, and for making the second rotational shaft freely rotatable with respect to the wheel train during rotation of the operating member in the second direction.

2. A camera as claimed in claim 1; further comprising a camera main body having a first surface and a second surface opposite the first surface, the operating member being accessible from both the first and second surfaces of the camera main body during manual operation.

3. A camera as claimed in claim 2; wherein each of the first and second surfaces of the camera main body has a recess; and wherein the operating member extends into but does not protrude from the recesses of the first and second surfaces.

4. A camera as claimed in claim 1; wherein the second clutch mechanism comprises a coil spring having an end portion connected with the second rotational shaft.

5. A camera comprising: a film cartridge chamber for accommodating a film cartridge containing film, the film cartridge having a first rotational shaft; operating means mounted for rotation in first and second opposite directions by manual operation for winding and rewinding the film, respectively; a second rotational shaft for connection to the operating means during rotation of the operating means in the first direction; transmitting means for transmitting rotational movement of the operating means to the first rotational shaft to wind and rewind the film; first clutch means for disconnecting transmission of rotational movement by the wheel train when a tensional state of the film is generated; and second clutch means for connecting the operating means to the second rotational shaft for integral rotation therewith during rotation of the operating means in the first direction, and for making the second rotational shaft freely rotatable with respect to the transmitting means during rotation of the operating means in the second direction.

6. A camera as claimed in claim 5; wherein the second clutch means comprises a coil spring having an end portion connected with the second rotational shaft.

* * * * *